US006567987B1

(12) United States Patent
Farhan et al.

(10) Patent No.: US 6,567,987 B1
(45) Date of Patent: May 20, 2003

(54) DIGITAL OPTICAL TRANSMITTER WITH IMPROVED NOISE POWER RATIO

(75) Inventors: Forrest M. Farhan, Duluth, GA (US); Joseph Graham Mobley, Dunwoody, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/246,997

(22) Filed: Feb. 16, 1999

(51) Int. Cl.[7] .......................... H04N 7/173; H04N 17/02
(52) U.S. Cl. .................... 725/125; 725/124; 725/127; 725/129; 348/193
(58) Field of Search .................... 725/129, 119–128, 725/105, 111, 131, 139, 151; 348/192, 193, 607, 608, 613; 359/110, 146, 125, 167, 180, 161, 187, 194; 330/136, 78–85

(56) References Cited

U.S. PATENT DOCUMENTS

| 5,289,459 A | * | 2/1994 | Brownlie ................ 370/17 |
| 5,499,047 A | * | 3/1996 | Terry et al. ................ 348/6 |
| 5,579,321 A | | 11/1996 | Van Grinsven et al. |
| 5,606,725 A | * | 2/1997 | Hart ......................... 455/5.1 |
| 5,687,014 A | * | 11/1997 | Czerwiec et al. ........... 359/123 |
| 5,861,966 A | * | 1/1999 | Ortel ......................... 351/125 |
| 5,944,281 A | * | 8/1999 | Pittman et al. ............. 244/3.12 |
| 5,969,840 A | * | 10/1999 | Roberts ....................... 359/161 |
| 6,069,530 A | * | 5/2000 | Clark ........................ 330/149 |
| 6,069,722 A | * | 5/2000 | Schlag ....................... 359/181 |
| 6,091,932 A | * | 7/2000 | Langlais ..................... 455/5.1 |
| 6,166,760 A | * | 12/2000 | Kay ............................ 348/12 |
| 6,175,601 B1 | * | 1/2001 | Rybicki et al. ............. 375/345 |
| 6,295,148 B1 | * | 9/2001 | Atlas ......................... 359/125 |
| 6,389,013 B1 | * | 5/2002 | Doss et al. ................. 370/364 |
| 6,504,630 B1 | * | 1/2003 | Czarnocha et al. .......... 359/110 |

FOREIGN PATENT DOCUMENTS

EP          0 828 391        8/1997

* cited by examiner

Primary Examiner—John Miller
Assistant Examiner—Annan Q. Shang
(74) Attorney, Agent, or Firm—Kenneth M. Massaroni; Hubert J. Barnhardt, III; Shelley L. Couturier

(57) ABSTRACT

A cable television system (400) includes a transmitter (200) for generating a digital optical signal (204) and a receiver (300) for receiving said digital optical signal and converting it to an analog signal. The transmitter (200) includes a processor (238) for processing inputs and generating a gain/loss parameter which is applied via a gain/loss amplifier (250) to an incoming analog signal (232). The modified digital signal received by the digital optical receiver (300) decodes the applied gain/loss parameter at a converter (325) and applies the information to the output analog signal via a gain/loss amplifier (330).

21 Claims, 2 Drawing Sheets

US 6,567,987 B1

DIGITAL OPTICAL TRANSMITTER WITH IMPROVED NOISE POWER RATIO

FIELD OF THE INVENTION

This invention relates in general to fiber optic communications, and more particularly to optical transmitters and receivers for use in fiber optic communications systems.

BACKGROUND OF THE INVENTION

Cable television systems typically include a headend section for receiving satellite signals and demodulating the signals to an intermediate frequency ("IF") or a baseband signal. The baseband or IF signal is then modulated with radio frequency ("RF") carriers, then combined and converted to an optical signal for transmission from the headend section over fiber optic cable. Optical transmitters are distributed throughout the cable system for splitting and transmitting optical signals, and optical receivers are provided for receiving the optical signals and converting them to RF signals that are further transmitted along branches of the system over coaxial cable rather than fiber optic cable. Devices known as taps are situated along the coaxial cable to split off the cable signal and direct it to the cable systems subscribers.

While cable systems have traditionally been designed in order to be one way systems, that is for information to flow from the cable headend to the subscriber's location, changes in the cable industry have necessitated the ability for information generated at subscriber locations to flow back to the headend. Accordingly, cable systems have been recently modified from having simply a forward path, i.e., information flowing from the headend to the subscriber, to include a reverse path for allowing information from the subscriber to flow back to the headend. Examples of information that would flow in the reverse path include data relating to status monitoring of the subscriber device, subscriber pay-per-view programming selections, cable modem information, and two-way video and telephony services. Information transmitted from the headend to the subscriber is typically in the frequency range of between approximately 50 megahertz ("MHz") and 750 MHz, while information being transmitted in the reverse path is typically in the frequency range from between 5 and 40 MHz.

Various factors influence the ability to accurately transmit and receive optical signals within a cable television system. As the length of fiber optic cable within a system increases, for example, signal losses also increase. Furthermore, temperature fluctuations which cause variation in the optical modulation index of the optical transmitter, can result in variation of the RF output level for the optical receiver. Signal distortions may also be caused by non-linearities in the optical transmitter laser and photodiode of the optical receiver. Finally many of the devices interposed in the forward and reverse path themselves introduce noise and other distortions into the system. Accordingly, in many instances the range of the particular system in question is limited both in terms of distance and bandwith capability.

Although these problems may be mitigated by employing expensive techniques, e.g., decreasing fiber length between optical nodes, such techniques may prohibitively increase costs to both subscribers and service providers. Accordingly, there exists a need for more reliable and accurate transmission of optical signals within a cable television system. In particular, improved optical signal reliability and accuracy in reverse path transmissions is critically needed.

DETAILED DESCRIPTION OF THE PREFERRED EMBODIMENTS

Figure 1:
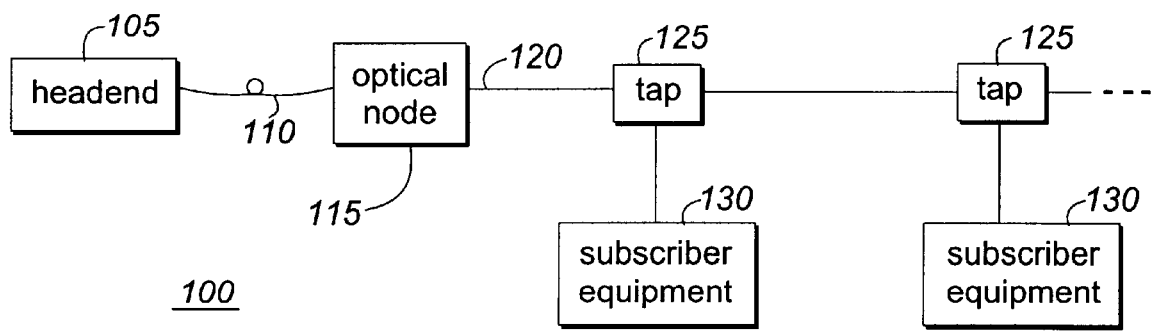
FIG. 1 is a block diagram of a cable television system in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a communication system, such as a cable television system 100 having both forward and reverse paths, i.e., having the ability to communicate downstream in the forward direction and upstream in the reverse direction. The cable television system 100 includes a headend 105 for receiving satellite signals that are demodulated to baseband or an intermediate frequency ("IF"). The baseband signal is then converted to cable television signals that are routed throughout the system 100 to subscriber equipment 130, such as settop decoders, televisions, or computers, located in the residences or offices of system subscribers. The headend 105 may, for example, convert the baseband signal to an optical signal that is transmitted over fiber optic cable 110, in which case a remotely located optical node 115 converts the optical signal to an electrical radio frequency ("RF") signal for further transmission through the system 100 over coaxial cable 120. Taps 125 located along the cable 120 at various points in the distribution system split off portions of the RF signal for routing to subscriber equipment 130 coupled to subscribed drops provided at the taps 125.

As noted above, the system 100 also has reverse transmission capability so that signals, such as data, video or voice signals, generated by the subscriber equipment 130 can be provided back to the headend 105 for processing. The reverse signals travel through the taps 125 and any nodes 115 and other system equipment, e.g., reverse amplifiers, to the headend 105. In the configuration shown in FIG. 1, RF signals generated by the subscriber equipment 130 travel to the node 115 which converts the RF signals to optical signals for transmission over the fiber optic cable 110 to the headend 105.

Figure 2:
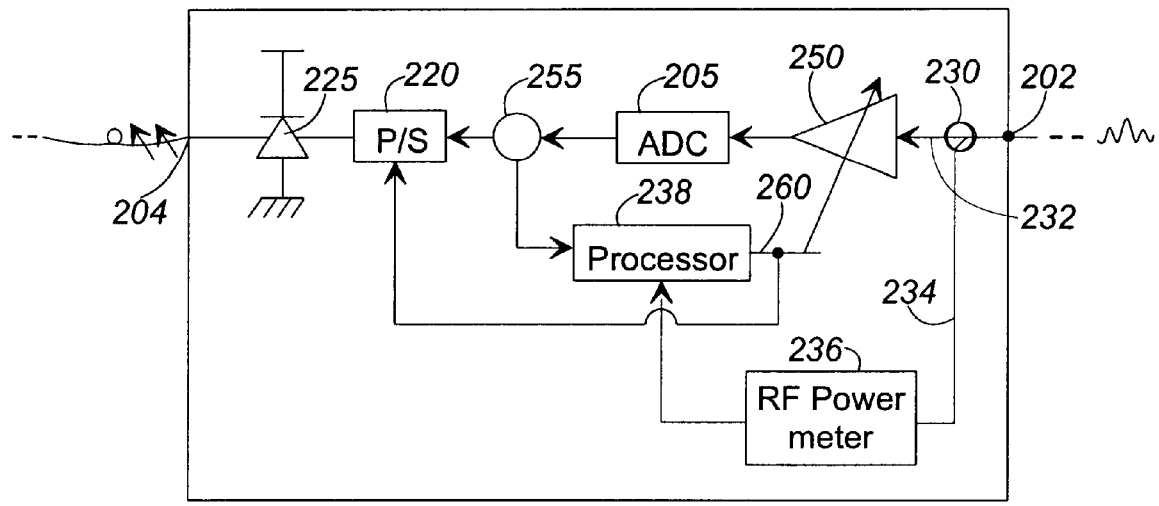
FIG. 2 is an electrical block diagram of an optical transmitter included in the cable television system of FIG. 1, in accordance with the instant invention.

Referring now to FIG. 2 there is illustrated therein a digital optical transmitter 200 adapted to transmit digital optical signals to the headend 105 in the reverse direction. The digital optical transmitter 200 can, for example, be included within the optical node 115, although other locations within the cable television system 100 may also include the digital optical transmitter 200 of the present invention. The transmitter 200 receives, at an input 202, an analog information signal that is representative of one or more reverse RF signals from the subscriber equipment 130. At its output 204, the transmitter 200 provides a digital optical signal that is generated in accordance with the analog information signal. The transmitter may also provide an optional pilot tone that serves to provide a reference level during processing at the headend 105, as is described in commonly assigned co-pending patent application Ser. No. 09/169,612 filed Oct. 9, 1998 and entitled "Digital Optical Transmitter" to Farhan, the disclosure of which is incorporated herein by reference.

More particularly, the digital optical transmitter 200 includes an analog-to-digital converter ("ADC") 205 for converting the analog input to a digital signal, i.e., a digital word comprising a particular number of bits, in a conventional manner. The resolution of the ADC 205 of course is dependent upon transmitter design parameters. The transmitter 200 can also include a parallel-to-serial ("P/S") converter or serializer 220, which receives inputs from the ADC 205 and other components described in greater detail hereinbelow, and converts the inputs into a serial bit stream. A laser diode 225 is then driven to generate an optical signal in accordance with the serial bit stream. It will be appreciated that a serializer 220 may also include a driver for driving the laser diode 225 and frame and coding circuitry for encoding the serialized digital signal into frames of data.

Signals received from the input 202 are directed through a splitter 230 which splits the signals into at least a first branch 232 and a second branch 234. The signal along branch 234 is directed to an RF power meter 236 adapted to measure the power of the incoming RF signal, and subsequently a processor 238 The processor 238 provides a means for applying attenuation to amplifier 250. The ability to attenuate prevents long-term saturation of the ADC in the event of a strong interfering signal.

The RF signal on branch 232 is passed first to a variable gain/loss amplifier 250 and then on to the ADC 205. The long-term average power presented to the ADC is monitored by power monitor 255. Monitor 255 provides adjustment requests to processor 238 so that small refinements to the gain/loss in the amplifier 250 can be made to select an optimum operating level to ADC 205 commensurate with highest signal-to-noise ration without possibility of overload.

The processor 238 uses the information from the power analyzer 255 as well as the RF power meter information generated at RF power meter 236 to provide the variable gain/loss amplifier with a gain/loss parameter to be applied to the output signal. The gain/loss parameter is provided from the processor via line 260. Concurrently, the gain/loss parameter is provided to the serializer 220 and is encoded and transmitted in-band to be passed to the receiver, in this case the headend 105.

Figure 3:
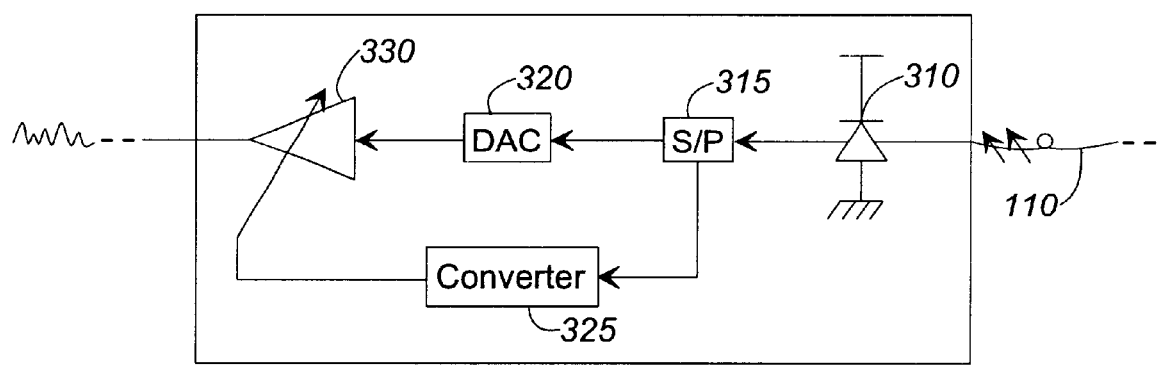
FIG. 3 is an electrical block diagram of an optical receiver included in the cable television system of FIG. 1, in accordance with the instant invention.

Referring now to FIG. 3 there is illustrated therein an electrical block diagram of a digital optical receiver 300 for receiving the digital optical signal transmitted by the digital optical transmitter 200. The receiver 300 can be, for instance, located in the headend 105, although other locations such as any intervening nodes or hubs may also employ the receiver 300. The receiver 300 includes a detector, such as photodiode 310, for receiving the digital optical signal transmitted over the fiber optic cable 110 and generating therefrom a serial stream of electrical pulses in accordance with the optical signal. The output signals provided by the photodiode 310 are coupled to a serial-to-parallel ("S/P") converter 315 for generating therefrom a set of parallel outputs corresponding to a digital word. The receiver 300 further includes a digital-to-analog converter ("DAC") 320 for converting the signal provided at its digital input to an analog signal in a manner well known in the art.

The receiver 300 further includes a converter 325 to read and decode the gain/loss parameter previously transmitted by the digital optical transmitter 200. The converter decodes the digital word representing the gain/loss parameter applied at the transmit site and presents this decoded signal to output amplifier 330. Generally, for each decibel of incremental gain inserted at the input to the transmitter, an equivalent of incremental loss is applied at the output amplifier of the receiver. In the manner, the overall signal gain will remain constant which the dynamic loading in the digital sections will change to optimize digital performance. The digital word representing the gain/loss parameter typically may be inserted in the packet stream, behind the header information. Other locations for this information will however also work. The frequency of this digital word will depend upon the signalling system, though in conventional SONET systems, frequency is on the order of approximately 8000 times per second.

The converter may use the formula of 1/(gain/loss) parameter to convert the encoded gain/loss parameter information. The resulting information is provided to a variable gain/loss amplifier 330 coupled to the output of DAC 320 to adjust the analog output of DAC 320 to compensate for the adjustments made at the transmit end in the digital optical transmitter 200. The resulting analog output signal will therefore have a power level very close to the transmitter RF power input, yet will enjoy optimized signal to quantization ratio and signal to intermodulation distortion ratio by adjusting the analog signal presented to the digital conversion process so that the full dynamic range of the digital system is used.

It should be noted that the processor 238 will preferably apply gain in relatively small quantum steps, accordingly allowing time for the digital optical receiver 300 to react to gain applied before the next gain step.

Note also that once an input power level threshold is surpassed for a predetermined threshold period of time, the power level should drop to below the power threshold and stay below that power threshold for a predetermined time duration before gain is set to the previous value. This margin will ensure that gain transitions will not oscillate at close to the power threshold levels. The time threshold will ensure that sufficient amounts of time have elapsed to determine that the new gain level has been properly integrated thereby preventing a situation in which power transients trigger additional gain application. Also, gain scaling is encoded and presented to the receiver in advance of any gain change so that disparity between transmitter and receiver does not exist.

Figure 4:
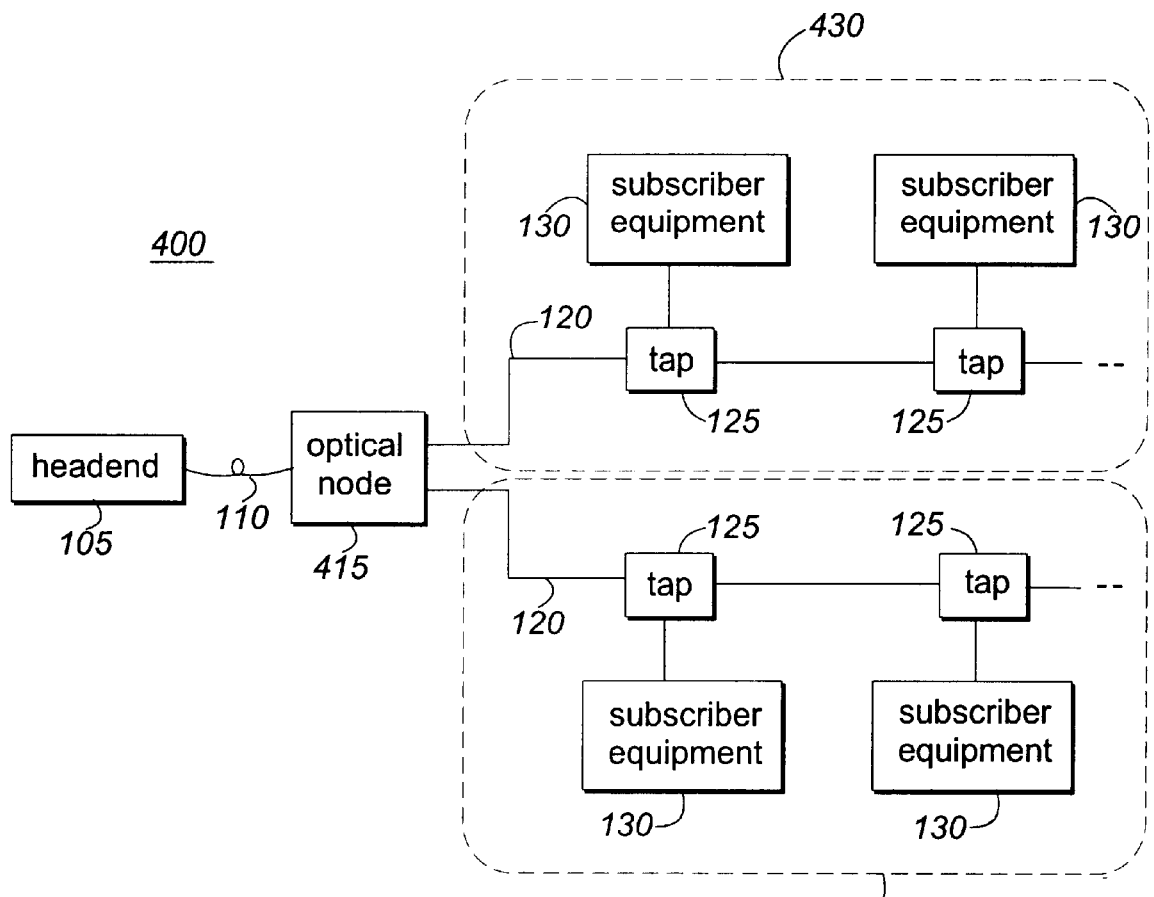
FIG. 4 is a block diagram of a cable television system having multiple outputs to subscriber regions, in accordance with the instant invention.

Referring now to FIG. 4, a modified cable system 400 is depicted. The system 400 includes a headend 105 for generating cable television signals that are split off to subscriber equipment 130 by taps 125. However, in the system 400 the optical node 415 splits off the downstream cable signal for transmission to multiple distribution systems 430 and 435 or branches. Each branch typically provides service to subscribers located in different geographic regions. Upstream reverse signals provided by subscriber equipment 130 in the different branches 435 is transmitted in the form of analog RF signals to the optical node 415, which combines the signals for further upstream transmission in the form of an optical signal. According to the present invention, the upstream signals from the different branches can be converted to digital optical signals in a manner that minimizes or eliminates many of the problems associated with prior art cable television systems.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for optimizing the dynamic range of the noise power ratio in a hybrid fiber/coaxial cable transmission system, said method comprising the steps of:
    evaluating a digital output of an analog-to-digital converter (ADC) to determine a gain/loss parameter, wherein the step of evaluating comprises the steps of:
        determining an RF power level prior to said ADC; and
        comparing said RF power level to said digital output;
    amplifying said digital output if said gain/loss parameter is below a predetermined threshold value; and
    attenuating said digital output of said gain/loss parameter in above said predetermined threshold value.

2. A method as in claim 1, wherein said hybrid fiber/coaxial cable transmission system is a cable television system.

3. A method as in claim 1, wherein said transmission system includes a forward communication path and a reverse communication path.

4. A method as in claim 3, wherein said optimized dynamic range relates to said reverse communication path.

5. A method as in claim 1, including the further step of transmitting said gain/loss parameter to a receiver coupled to said transmission system.

6. A method as in claim 5, wherein said transmitted gain/loss parameter is transmitted in encoded form.

7. A method as in claim 5, including the further steps of:
    converting said digital output to an analog output; and
    adjusting said analog output in relation to said gain/loss parameter.

8. A method as in claim 7, wherein the step of adjusting includes the step of adjusting by the inverse of the gain/loss parameter.

9. An optical transmitter comprising:
    an analog-to-digital converter (ADC) for converting an analog information signal to a digital information signal;
    a processor for generating a gain/loss parameter in response to said analog information signal and said digital information signal;
    a variable amplifier coupled to said ADC and said processor for adding said gain/loss parameter; and
    a laser for providing an optical signal in response to said digital information signal.

10. An optical transmitter as in claim 9, wherein said optical transmitter is included in a reverse path of a cable television system, for transmitting information from system subscribers to a headend.

11. An optical transmitter as in claim 9, further including an RF power detector coupled between a source of said analog information signal and said processor.

12. An optical transmitter as in claim 9, further including power analyzing means coupled between said ADC and said gain/loss block.

13. An optical transmitter as in claim 9, further comprising a parallel-to-serial converter coupled to said laser.

14. A cable television system for providing signals, the cable television system comprises:
    an optical transmitter for receiving an analog information signal and transmitting in accordance therewith a digital optical signal representative of the analog information signal, said optical transmitter including means for applying a gain/loss parameter to the analog information signal, the optical transmitter comprising:
        an analog-to-digital converter (ADC) for converting an analog information signal to a digital information signal;
        a processor for generating a gain/loss parameter in response to said analog information signal and said digital information signal;
        a variable amplifier coupled to said ADC and said processor for adding said gain/loss parameter; and
        a laser for providing an optical signal in response to said digital information signal;
    an optical receiver for receiving the digital optical signal and the gain/loss parameter and recovering therefrom an analog signal representative of the analog information signal; and
    an optical communication medium for coupling the optical transmitter and the optical receiver.

15. A cable television system as in claim 14, wherein said optical transmitter is included in a reverse path of a cable television system, for transmitting information from system subscribers to a headend.

16. A cable television system as in claim 14, further including an RF power detector coupled between a source of said analog information signal and said gain/loss block.

17. A cable television system as in claim 14, further including power analyzing means coupled between said ADC and said gain/loss block.

18. A cable television system as in claim 14, further comprising a parallel-to-serial converter coupled to said laser.

19. The cable television system of claim 14, wherein said optical receiver comprises:
    a detector for converting the digital optical signal to a digital electrical signal;
    a digital-to-analog (D/A) converter for converting the digital electrical signal to an analog electrical signal; and
    a converter for processing the gain/loss parameter.

20. The cable television system of claim 14, further comprising:
    a forward path for transmitting information to system subscribers; and
    a reverse path for receiving information from system subscribers, wherein the reverse path includes the optical transmitter and the optical receiver.

21. A cable television system having forward and reverse paths for respectively transmitting forward and reverse signals, the cable television system comprising:
    first and second distribution systems for providing information to system subscribers located, respectively, in first and second geographic regions;
    a headend for generating and transmitting optical signals;
    an optical node, remotely located from the headend, for converting the optical signals to electrical signals and for transmitting the electrical signals over the first and second distribution systems, wherein, in the reverse path, the optical node comprises an optical transmitter, including:
        an analog-to-digital converter (ADC) for receiving a first analog information signal from subscriber equipment included in the first distribution system and converting the first analog information signal to a first digital information signal;

a processor for generating a gain/loss parameter in response to said analog information signal and said digital information signal;

a variable amplifier coupled to said ADC and said processor for adding said gain/loss parameter; and a laser diode for emitting a digital optical signal in accordance with the digital information signal and said gain/loss parameter.

* * * * *